(12) United States Patent
Tonegawa

(10) Patent No.: US 9,285,046 B2
(45) Date of Patent: Mar. 15, 2016

(54) CONTROL VALVE

(71) Applicant: TGK CO., LTD, Tokyo (JP)

(72) Inventor: Masaaki Tonegawa, Tokyo (JP)

(73) Assignee: TGK CO., LTD, Tokyo (JP)

( * ) Notice: Subject to any disclaimer, the term of this patent is extended or adjusted under 35 U.S.C. 154(b) by 128 days.

(21) Appl. No.: 13/900,458

(22) Filed: May 22, 2013

(65) Prior Publication Data

US 2013/0313461 A1   Nov. 28, 2013

(30) Foreign Application Priority Data

May 25, 2012   (JP) .................................. 2012-120152

(51) Int. Cl.
| | |
|---|---|
| *F16K 31/12* | (2006.01) |
| *F16K 17/00* | (2006.01) |
| *F25B 41/06* | (2006.01) |

(52) U.S. Cl.
CPC ............... *F16K 17/00* (2013.01); *F25B 41/062* (2013.01); *F16K 31/12* (2013.01)

(58) Field of Classification Search
CPC ....... F16K 31/122; F16K 17/00; F16K 31/12; F25B 41/062
USPC ................. 251/30.01–30.03, 33, 38
See application file for complete search history.

(56) References Cited

U.S. PATENT DOCUMENTS

| | | | | |
|---|---|---|---|---|
| 1,157,870 | A * | 10/1915 | Houser | 251/38 |
| 1,885,846 | A * | 11/1932 | Littlefield | 251/30.03 |
| 2,351,871 | A * | 6/1944 | Parker | 137/491 |
| 2,351,873 | A * | 6/1944 | Parker | 137/491 |
| 2,654,393 | A * | 10/1953 | Ghormley | 251/30.01 |
| 3,410,518 | A * | 11/1968 | Carsten | 251/31 |
| 3,818,398 | A * | 6/1974 | Barbier et al. | 335/278 |
| 3,858,841 | A * | 1/1975 | Haynes | 251/43 |
| 6,189,563 | B1 * | 2/2001 | Taylor | 137/487.5 |
| 6,481,982 | B1 * | 11/2002 | Yokomichi | 417/395 |

FOREIGN PATENT DOCUMENTS

JP   H11-287354   10/1999

* cited by examiner

*Primary Examiner* — Marina Tietjen
*Assistant Examiner* — Umashankar Venkatesan
(74) *Attorney, Agent, or Firm* — Martine Penilla Group, LLP

(57) ABSTRACT

An expansion valve according to one embodiment includes a body having an internal passage through which the working fluid flows, a valve hole provided in the internal passage, a driven member that opens and closes a valve section by touching and leaving the valve hole, a guide member that slidably supports the driven member inserted along the guide member, and a shield wall, provided in the driven member, which closes one end opening of the spacing between the driven member and the guide member when the valve section is fully opened.

6 Claims, 7 Drawing Sheets

CONTROL VALVE

CLAIM OF PRIORITY TO RELATED APPLICATION

The present application is claiming priority of Japanese Patent Application No. 2012-120152, filed on May 25, 2012, the content of which is incorporated herein by reference.

BACKGROUND OF THE INVENTION

1. Field of the Invention

The present invention relates to a control valve for controlling the flow of working fluid.

2. Description of the Related Art

An automotive air conditioner is generally configured such that it includes a compressor, a condenser, an evaporator, and so forth arranged in a refrigerant circulation passage. Various types of control valves are provided (see Reference (1) in the following Related Art List, for instance). Here, these various types of control valves are, for example, used to switch the refrigerant circulation passages according to the operation state in such a refrigeration cycle and regulate the flow rate of refrigerant. A mechanical valve, which opens and closes a valve section through a balance between the force exerted by a pressure received from the refrigerant and the biasing force of a spring opposing the force exerted thereby, and an electrically driven valve, provided with an actuator for electrically regulating the opening degree of the valve section from the outside, are used, as appropriate, as the control valves used herein.

Related Art List (1) Japanese Unexamined Patent Application Publication (Kokai) No. Hei11-287354.

In such an air conditioner as one described above, there are cases where the discharged refrigerant contains foreign material, such as metallic powders, as a result of frictional wear and the like of a sliding portion of the compressor. The foreign material may flow into the sliding portion of the control valve in a process where the refrigerant circulates in the refrigeration cycle and may hinder the smooth sliding operation. In other words, pressure differences between an upstream side and a downstream side of the valve section occur in a valve element. Thus, a pressure difference also occurs in between an inlet port and an outlet port of the sliding portion of the valve element, and the foreign material flows into the sliding portion through this pressure difference. As a result of adhesion of the foreign material to the sliding portion may possibly interfere with the smooth opening and closing of the valve element. The same problem may arise not only in vehicles but also in apparatuses provided with the control valves.

SUMMARY OF THE INVENTION

A purpose of the present invention is, therefore, to provide a control valve capable of preventing or inhibiting the malfunction of valve section caused by the entry of foreign material contained in the working fluid.

In order to resolve the aforementioned problems, a control valve according to one embodiment of the present invention includes: a body having an internal passage through which a working fluid flows; a valve hole provided in the internal passage; a driven member configured to open and close a valve section by touching and leaving the valve hole; a guide member configured to slidably support the driven member inserted thereto; and a shield part, provided in the driven member, configured to close one end opening of a spacing between the driven member and the guide member when the valve section is fully opened.

By employing this embodiment, an opening end of the spacing between the driven member and the guide member is closed at least when the valve section is fully opened. Thus, the entry of foreign material into the spacing therebetween is restricted in the event that the foreign material is introduced together with the working fluid. As a result, the malfunction of valve section caused by the entanglement of foreign material contained in the working fluid can be prevented or inhibited.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
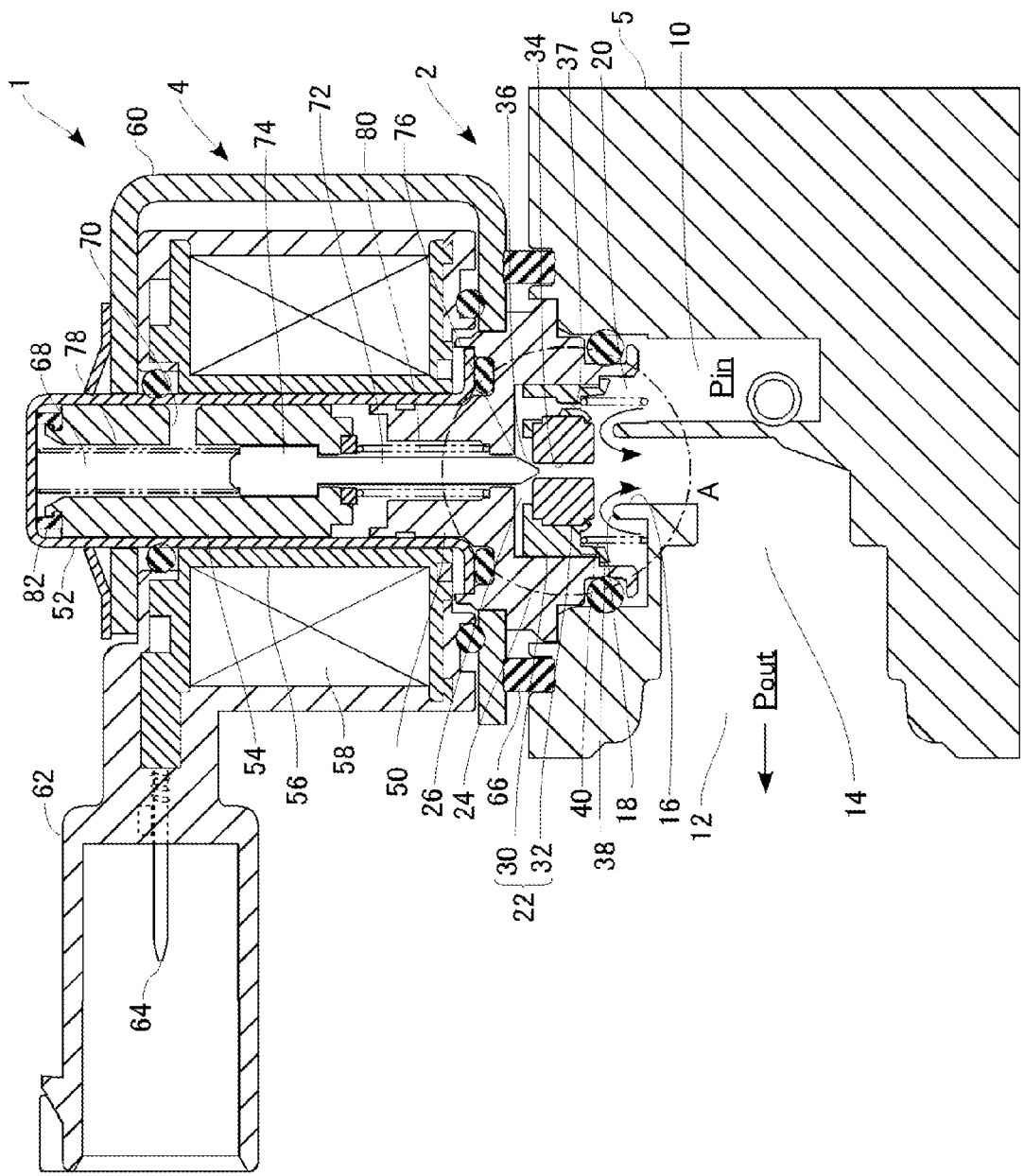
FIG. 1 is a cross-sectional view showing a concrete structure and operation of a control valve according to a first embodiment.

The invention will now be described based on preferred embodiments which do not intend to limit the scope of the present invention but exemplify the invention. All of the features and the combinations thereof described in the embodiment are not necessarily essential to the invention.

The present invention will now be described in detail based on preferred embodiments with reference to the accompanying drawings.

[First Embodiment]

The present embodiment is a constructive reduction to practice of the present invention wherein the control valve is used as an electromagnetic valve applied to a refrigeration cycle of a hybrid vehicle and an electric-powered vehicle. The refrigeration cycle is configured such that a first refrigerant circulation circuit, which is used to air-condition the interior of a passenger compartment, and a second refrigerant circulation circuit, which is used to cool an in-vehicle battery, are connected in parallel with each other. More specifically, a compressor, a condenser, and a receiver are provided in a commonly-used refrigerant circulation passage. A first expansion apparatus and an air-conditioning evaporator are provided in one of the branched separate refrigerant circulation passages, whereas a second expansion apparatus and an evaporator, used to cool the battery, are provided in the other thereof.

The high-temperature and high-pressure refrigerant compressed by a compressor is sent to a condenser where the refrigerant is subjected to a heat exchange with air outside the vehicle compartment. The condensed refrigerant is separated into gaseous refrigerant and liquid refrigerant at a receiver and then the liquid refrigerant is sent to at least one of the first expansion apparatus and the second expansion apparatus. The first expansion apparatus throttles and expands the thus introduced liquid refrigerant, thereby turns it into a low-temperature and low-pressure gas-liquid mixed refrigerant and sends out the gas-liquid mixed refrigerant to the air-conditioning evaporator. The air-conditioning evaporator has the refrigerant, sent from the first expansion apparatus, undergoes a heat exchange with air inside the passenger compartment so as to evaporate it and then brings back the evaporated gaseous refrigerant to the compressor. At this time, the first expansion apparatus detects the temperature of the refrigerant at an outlet port of the air-conditioning evaporator and controls the flow rate of the refrigerant sent out to the air-conditioning evaporator such that the refrigerant at the outlet port thereof has a predetermined degree of superheat.

Similarly, the second expansion apparatus throttles and expands the thus introduced liquid refrigerant, thereby turns it into a low-temperature and low-pressure gas-liquid mixed refrigerant and sends out the gas-liquid mixed refrigerant to the evaporator used to cool the battery. The battery cooling evaporator has the refrigerant, sent from the second expansion apparatus, undergo a heat exchange with the battery so as to evaporate it and then brings back the evaporated gaseous refrigerant to the compressor. At this time, the second expansion apparatus detects the temperature of the refrigerant at an outlet port of the battery cooling evaporator and controls the flow rate of the refrigerant sent out to the battery cooling evaporator such that the refrigerant at the outlet port thereof has a predetermined degree of superheat.

Each expansion apparatus is configured such that a not-shown expansion valve (thermostatic expansion valve) and a shutoff valve, which permits or shuts off the flow of refrigerant at a downstream side of a valve section of said expansion valve, are assembled as a combination valve. The control valve according to the first embodiment functions as the shutoff valve. That is, the control valves according to the first embodiment are respectively provided in the first expansion apparatus and the second expansion apparatus. When the air conditioner only is to be operated, the control valve of the first expansion apparatus is opened and the control valve of the second expansion valve is closed. Conversely, when a battery cooling apparatus only is to be operated, the control valve of the first expansion apparatus is closed and the control valve of the second expansion valve is opened.

Figure 2:
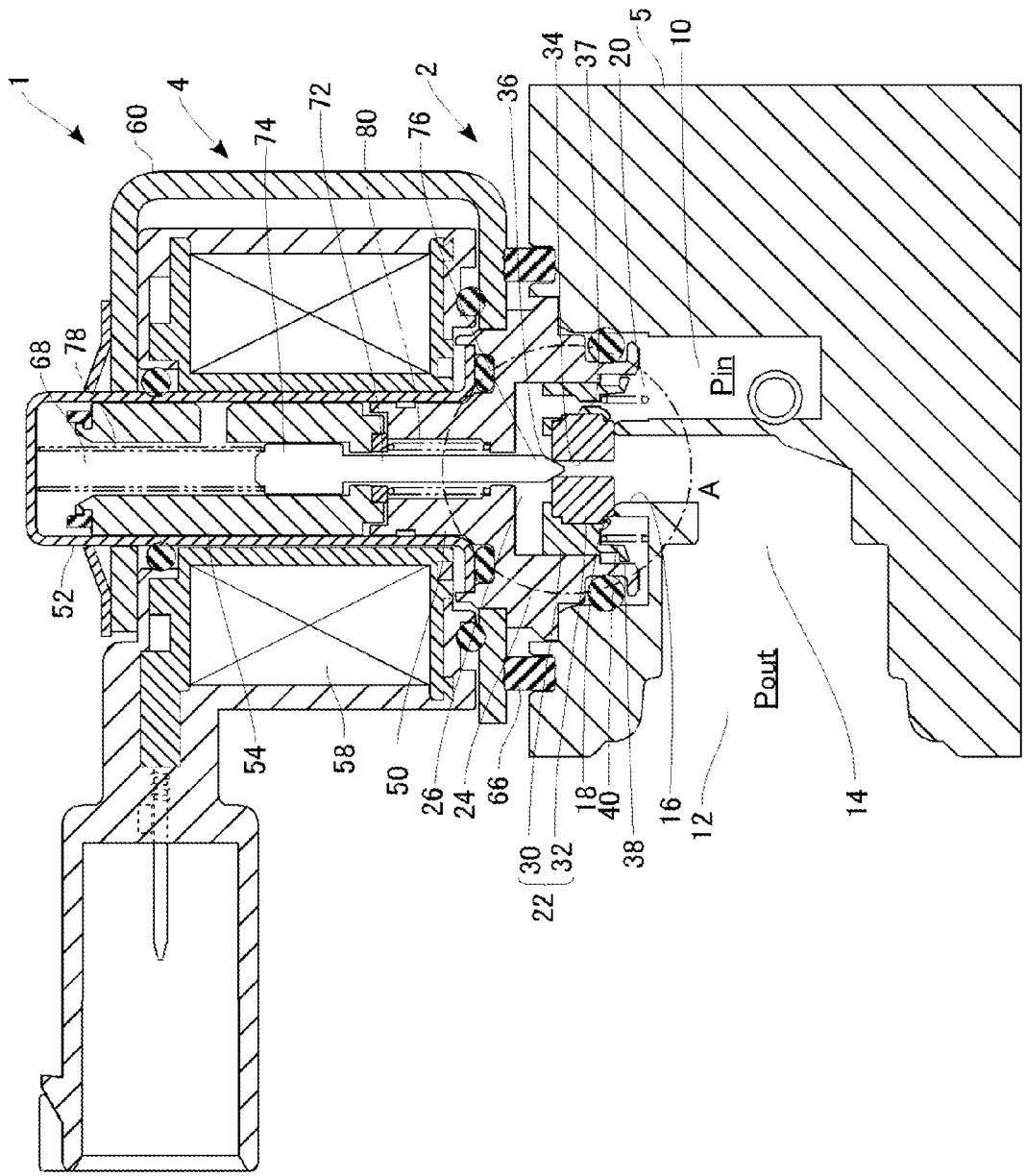
FIG. 2 is each a cross-sectional view showing a concrete structure and operation of a control valve according to a first embodiment.

A description is now given of a concrete structure of the control valve according to the first embodiment. The control valve according to the first embodiment is configured as a so-called pilot operated electromagnetic valve. FIG. 1 and FIG. 2 are each a cross-sectional view showing a concrete structure and operation of a control valve according to the first embodiment. As shown in FIG. 1, a control valve 1 is configured by integrally assembling a valve unit 2 and a solenoid 4. The control valve 1 is provided with a body 5 commonly used with its corresponding expansion valve.

Formed in the body 5 are a lead-in passage 10 leading to a not-shown lead-in port and a lead-out passage 14 leading to a lead-out port 12. A valve hole 16 is provided in between the lead-in passage 10 and the lead-out passage 14, and a valve seat 18 is formed in an opening end located upstream of the vale hole 16. A driven member 22 of a stepped cylindrical shape is disposed in a pressure chamber surrounded by the body 5 and the solenoid 4, namely in a pressure chamber 20 located upstream of the valve hole 16. A main valve is opened and closed with the driven member 22 touching and leaving the valve seat 18. Also, a guide member 24 of a stepped cylindrical shape extends from a solenoid 4 side toward a pressure chamber 20, and the driven member 22 is inserted into the guide member 24. The driven member 22 and the guide member 24 are disposed coaxially with the valve hole 16 (i.e., extend along the same axis line). The driven member 22 divides a back pressure chamber 26 in between the driven member 22 and the guide member 24.

The driven member 22 is one in which a valve element 32 formed of a cylindrical elastic body (e.g., polytetrafluoroethylene (PTFE) or rubber) is secured inside a cylindrical body 30. The main valve is opened and closed with the valve element 32 touching and leaving the valve seat 18. A pilot valve hole 34 runs through the valve element 32 along the axis line of the valve element 32. A pilot valve seat 36 is formed at an end of the pilot valve hole 34 on a back pressure chamber 26 side. A smaller-diameter orifice 37, which communicates to and from the back pressure chamber 26, and which also functions as a "leak passage", is formed near the periphery of the body 30. A shield wall 38, which extends radially outward in the form of a flange, is disposed at a lower end of the body 30. The shield wall 38 prevents or inhibits the foreign material contained in the refrigerant from being entangled or jammed in a sliding portion formed between the driven member 22 and the guide member 24; a detailed description of the shield wall 38 will be given later. The driven member 22 is configured such that an outer circumferential surface of the driven member 22 is supported slidably by an inner circumferential surface of the guide member 24, and the driven member 22 stably operates in the direction of axis line (in an opening or closing direction of the main valve). Set between the body 5 and the driven member 22 is a spring 40 that biases the driven member 22 in a valve opening direction and that also functions as a "biasing member".

The solenoid 4 is so mounted on an end surface of the body 5 as to seal the pressure chamber 20. The solenoid 4 includes a core 50 formed integrally with the guide member 24, a sleeve 52 secured to the core 50, a plunger 54 disposed within the sleeve 52 in a position opposite to the core 50, a bobbin 56 inserted around (outserted to) the sleeve 52 and fitted thereto, and an electromagnetic coil 58 wound around the bobbin 56. The plunger 54 is disposed opposite to the valve unit 2 relative to the core 50, namely, disposed at a bottom side of the sleeve 52. A resin mold is so applied to the electromagnetic coil 58 as to cover it from outside, and a casing 60 is so provided as to further cover this molded portion from outside. The casing 60 also functions as a yoke that constitutes a magnetic circuit. One end of a part of the molded portion extends outside the casing 60 so as to form a connector 62. A connection terminal 64 of the connector 62 connects to the electromagnetic coil 58. The casing 60 is coupled to the body 5 via a seal ring 66.

The core 50 is of a stepped cylindrical shape. The diameter of a lower half of the core 50 is enlarged and is formed connectedly on or formed integrally with the guide member 24. The plunger 54 is of a stepped cylindrical shape, and a back pressure chamber 68 is formed in a position opposite to the core 50. The back pressure chamber 68 communicates with the back pressure chamber 26 through a communicating path 70 provided at a plunger 54 side, a communicating groove (not shown) formed on the outer periphery of the plunger 54, a space between the core 50 and the plunger 54, and a clearance between the core 50 and an actuating rod 72. Thus, when the control valve 1 is in a mode in which it is controlled as shown in FIG. 2, both the back pressure chamber 26 and the back pressure chamber 68 are filled with the fluid having an upstream-side pressure Pin.

The actuating rod 72 is coaxially inserted inside the core 50 and the plunger 54. The actuating rod 72 has a stopper 74, having a slightly enlarged diameter, which is disposed at an upper end part of the actuating rod 72, and a lower end part of the actuating rod 72 is a tapered pilot valve element 76. The pilot valve element 76, which extends to the back pressure chamber 26, opens and closes a pilot valve by touching and leaving the pilot valve seat 36. Set between a bottom of the sleeve 52 and the stopper 74 is a spring 78 (functioning as a "biasing member") that biases the pilot valve element 76 in a valve closing direction. Also, set between the plunger 54 and the core 50 is a spring 80 (functioning as a "biasing member") that biases the plunger 54 in such a direction as to separate the plunger 54 away from the core 50. In the present embodiment, the spring load of the spring 80 is set larger than that of the spring 78.

By employing such a structure as described above, the pilot valve element 76 basically operates integrally with the plunger 54. And when the pilot valve element 76 is seated on the pilot valve seat 36, the pilot valve element 76 is displaceable relative to the plunger 54. As a result, when the solenoid 4 is turned on, the suction force does not directly exert on the pilot valve element 76. That is, the pilot valve can be closed by only the biasing force of the spring 78 and therefore the damage to the pilot valve seat 36, such as deformation or collapse thereof, can be minimized. A ring-shaped elastic body 82 (e.g., rubber) is fitted on the top end part of the plunger 54. This can suppress the hitting sound that may occur when the plunger 54 hits the sleeve 52 with the solenoid 4 turned off.

As the solenoid 4 is turned on (electrically conducting) as illustrated in FIG. 2, the suction force is created between the core 50 and the plunger 54 in the control valve 1 configured as described above and therefore the actuating rod 72 is displaceable, by the biasing force of the spring 78, in a valve closing direction. As result, the pilot valve element 76 is seated on the pilot valve seat 36, thereby closing the pilot valve. At this time, the refrigerant in the lead-in passage 10 is introduced into the back pressure chamber 26 through the orifice 37. This causes the pressure difference in a valve closing direction to greatly affect the driven member 22, which in turn closes the main valve resisting the biasing force of the spring 40. While the solenoid 4 is being kept on, the both main valve and the pilot valve maintain their closed states and therefore the pressure within the back pressure chamber 26 is maintained. As a result, the closed state of the main valve is also stably maintained.

As the on/off state of the solenoid 4 is switched from on to off (nonconducting state), the suction force is no longer present between the core 50 and the plunger 54. Thus the pilot valve 76 is lifted up and gets separated away from the pilot valve seat 36, and the pilot valve is in an open state. As a result, the refrigerant within the back pressure chamber 26 is led out to a downstream side via the pilot valve hole 34 and therefore the pressure within the back pressure chamber 26 drops. Since the passage cross-section of the orifice 37 is smaller than that of the pilot valve hole 34, a pressure difference is caused and temporarily acts on the valve element 22 in a valve opening direction. The valve element 22 is upthrusted by the force due to the pressure difference and the biasing force of the spring 40, which in turns opens the main valve at once.

A detailed description is now given of structures and operations of major components in the present embodiment.

Figure 3A:
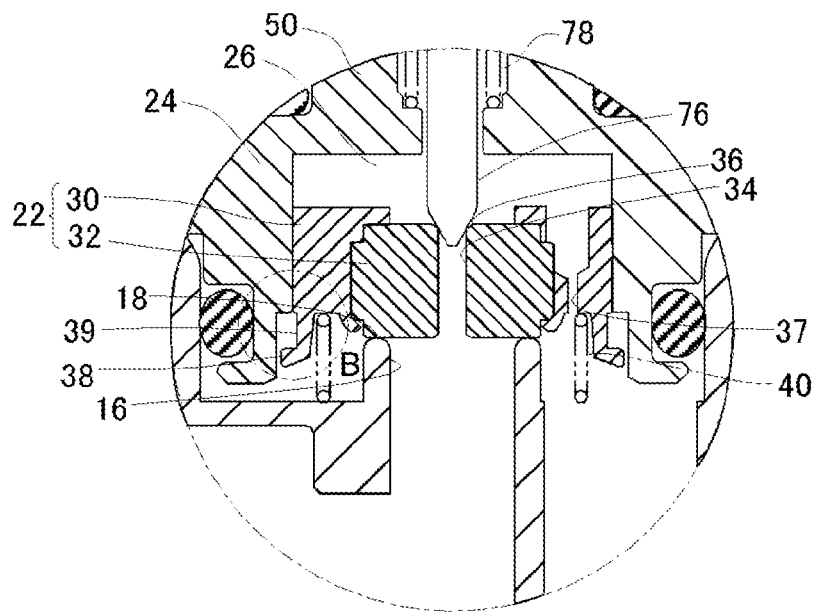
FIGS. 3A to 3C are each a partially enlarged cross-sectional view showing a concrete structure and operation of a driven member of a sliding portion of according to a first embodiment.
Figure 3B:
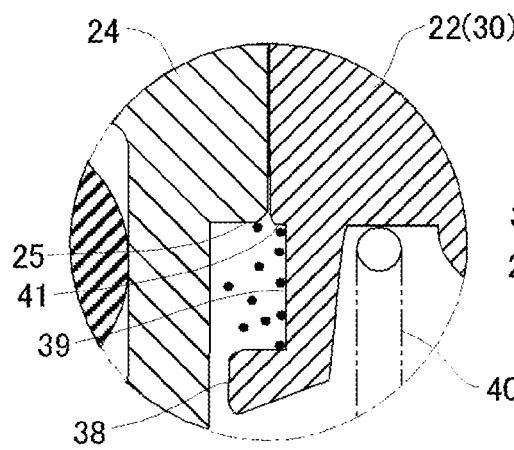
Figure 3C:
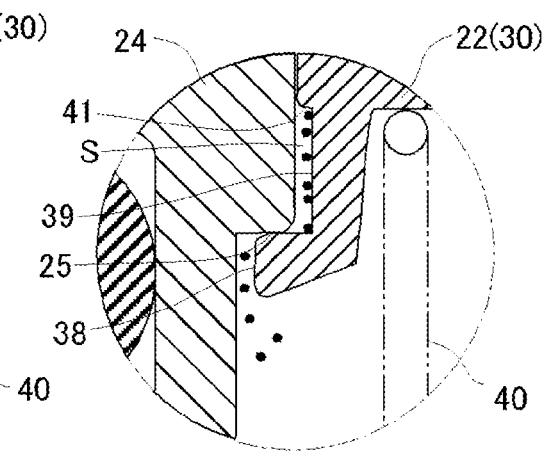

FIGS. 3A to 3C are each a partially enlarged sectional view showing structure and operation of a sliding portion of a driven member. FIG. 3A is an enlarged view of A in FIG. 2 and shows a state wherein the solenoid 4 is turned on. FIG. 3B is an enlarged view of B in FIG. 3A. FIG. 3C is an enlarged view showing a state wherein the solenoid 4 is turned off.

As shown in FIG. 3A and 3B, a recess 39 is provided between the sliding portion of the driven member 22 relative to the guide member 24 and the shield wall 38 thereof. The recess 39 is formed such that when the main valve is fully opened as shown in FIG. 3C, a space S is created between the sliding surface of the guide member 24 and the driven member 22 and such that when the main valve is closed as shown in FIG. 3B, an end surface 41 of the recess 39 on a back pressure chamber side (sliding portion side) is coplanar with an end surface 25 of the guide member 24.

By employing such a structure as described above in connection with FIG. 3B, even though foreign materials (see blacked-out circles in FIGS. 3B and 3C), such as metallic powders, contained in the refrigerant flow around the shield wall 38 and then adhere to the recess 39 when the main valve is opened, the foreign materials are trapped inside the space S in a process where the driven member 22 is displaced relative to the guide member 24 when the main valve is opened. This can prevent or inhibit the foreign material from entering the sliding portion formed between the driven member 22 and the guide member 24. That is, the refrigerant contains not only such foreign materials but also the lubricating oil of the compressor and therefore the lubricating oil may also adhere to the outer surface of the driven member 22. Accordingly, the foreign material is more likely to adhere by way of a lubricating oil layer formed on the driven member 22. In the light of this, the structure of the present embodiment is such that the recess 39 is formed in the driven member 22 which is the movable side. Also, the structure is such that even if a valve opening action causes the driven member 22 to be drawn inwardly of the guide member 24, the foreign material that has adhered to the recess 39 is less likely to come in contact with the sliding surface.

Also, the control valve 1 is a so-called on/off valve, so that when opening the valve section starts, the valve section quickly comes to a state of being fully opened as shown in FIG. 3C. Thus, the shield wall 38 is quickly seated on the end surface 25 of the guide member 24 and thereby one end opening of the spacing between the driven member 22 and the guide member 24 is closed. As a result, the entry of foreign material into the spacing therebetween is restricted even when the main valve is opened. Hence, the malfunction of valve section caused by the entanglement of foreign material can be prevented or inhibited.

(First Modification)

Figure 4A:
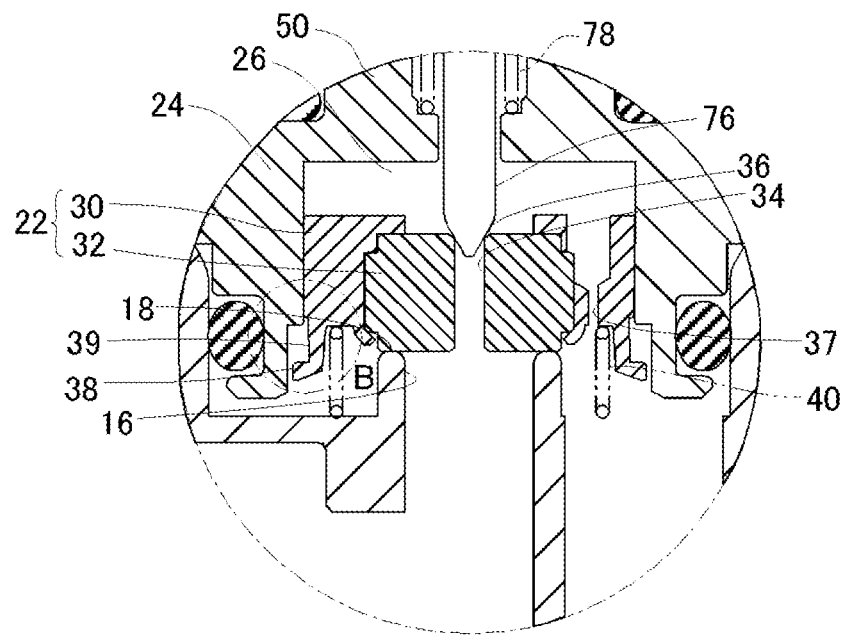
FIGS. 4A and 4B are each a partially enlarged cross-sectional view showing a structure of sliding portion in a driven member according to a modification.
Figure 4B:
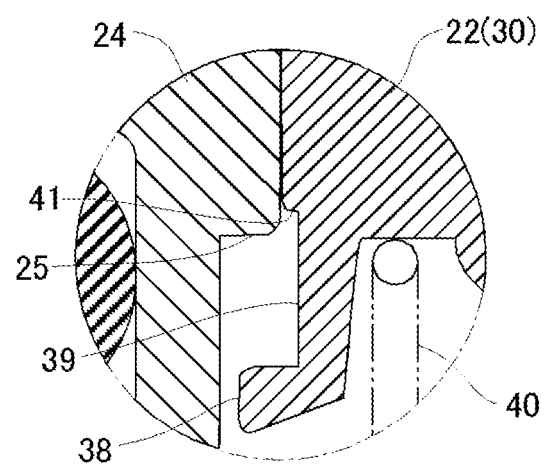

FIGS. 4A and 4B are each a partially enlarged cross-sectional view showing a structure of a sliding portion in a driven member according to a modification. FIG. 4A corresponds to FIG. 3A, whereas FIG. 4B corresponds to FIG. 3B. In the present modification, the recess 39 is formed such that when the valve section is closed, the end surface 41 of the recess 39 on the back pressure chamber side in the driven member 22 is positioned further toward a back pressure chamber 26 side (a sliding portion side) than the end surface 25 of the guide number 24. By employing such a structure as described above in connection with FIGS. 4A and 4B, even though the one end opening of the spacing between the driven member 22 and the guide member 24 is chamfered or the like, the adherence of foreign material near the sliding surface of the driven member 22 can be effectively inhibited. This can further prevent or inhibit the foreign material from being entangled in the sliding portion.

(Second Modification)

Figure 5A:
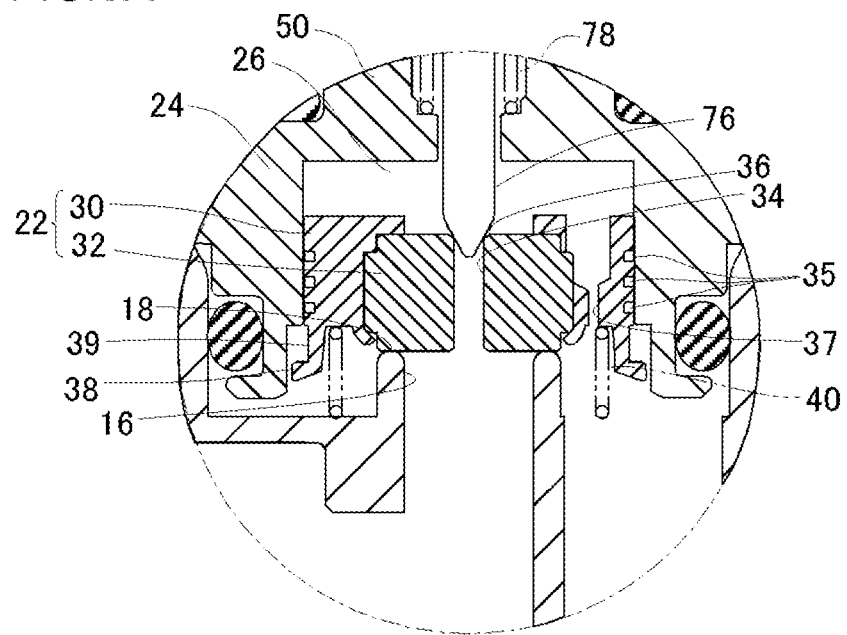
FIGS. 5A and 5B are each a partially enlarged cross-sectional view showing a structure of a sliding portion in a driven member according to another modification.
Figure 5B:
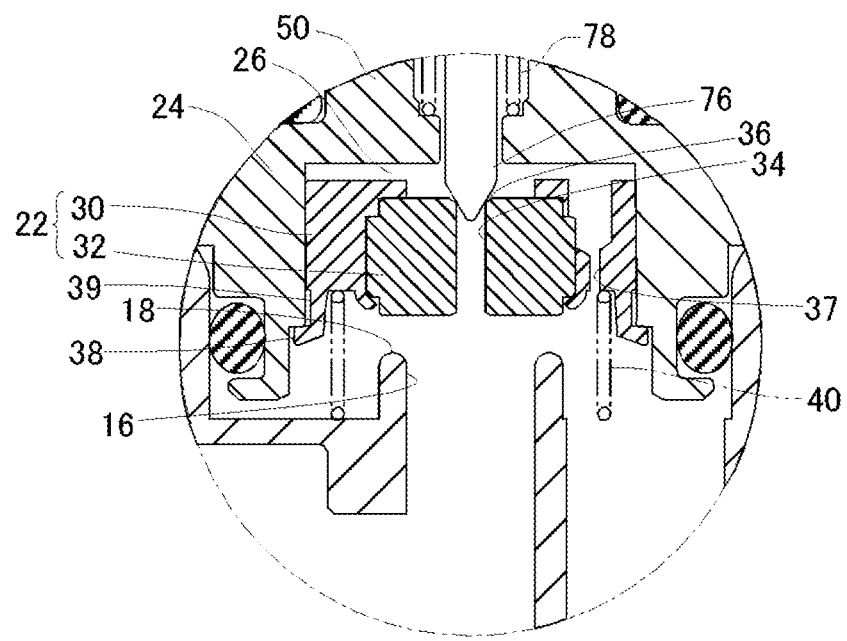

FIGS. 5A and 5B are each a partially enlarged cross-sectional view showing a structure of a sliding portion in a driven member according to another modification. Though not mentioned in the above-described first embodiment, a labyrinth 35 may be provided in the sliding surface of the driven member 22 relative to the guide member 24, as shown in FIG. 5A. By employing such a structure as described above in connection with FIG. 5A, the whole flow of refrigerant through the spacing between the driven member 22 and the guide member 24 can be restricted, so that the drawing-in of foreign material can be inhibited.

As illustrated in FIG. 5B, the pilot valve may be closed when the main valve is fully opened. For example, when the expansion valve, to which the control valve 1 is assembled, is installed in the refrigeration cycle, a vacuum drawing process will be performed to fill the refrigeration cycle with the refrigerant when the expansion valve is installed in the beginning of the manufacturing, and then it will be expected that flowback occurs in the control valve 1. In such a case, the magnitude relation in pressure is reversed. Thus, a high-pressure refrigerant may possibly be led into the pilot valve hole 34. In this respect, once the main valve is opened, the pilot valve is closed as shown in FIG. 5B and therefore it is less likely to occur in this modification that there will be an enough pressure difference to cause the driven member 22 to be in a closed position. That is, an event where the main valve is closed when the refrigerant is to be filled into the refrigeration cycle is prevented; therefore the difficulty arising in filling the refrigerant is also prevented. In light of only preventing the flowback, the shield wall 38 may not be provided at all in the driven member 22.

(Third Modification)

Figure 6A:
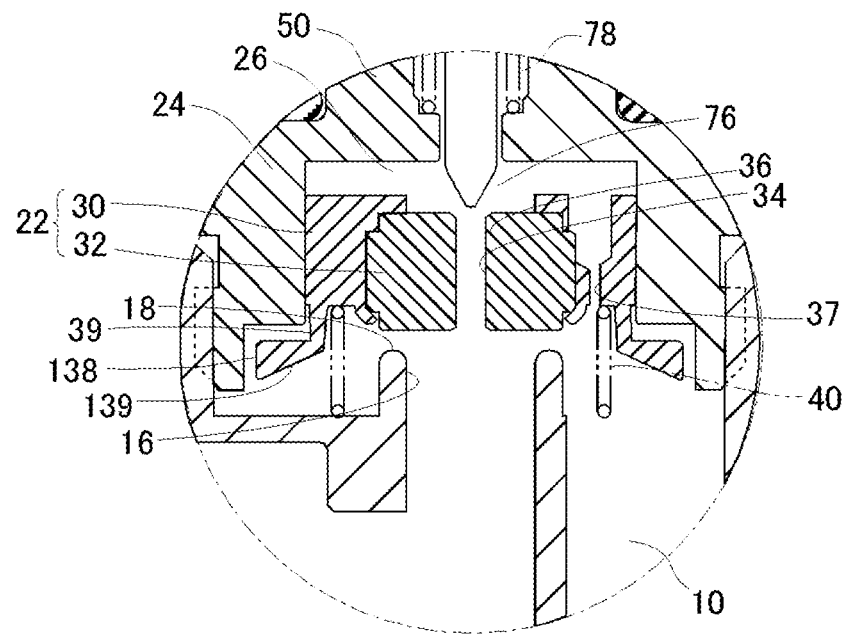
FIGS. 6A and 6B are each a partially enlarged cross-sectional view showing a structure of a sliding portion in a driven member according to still another modification.
Figure 6B:
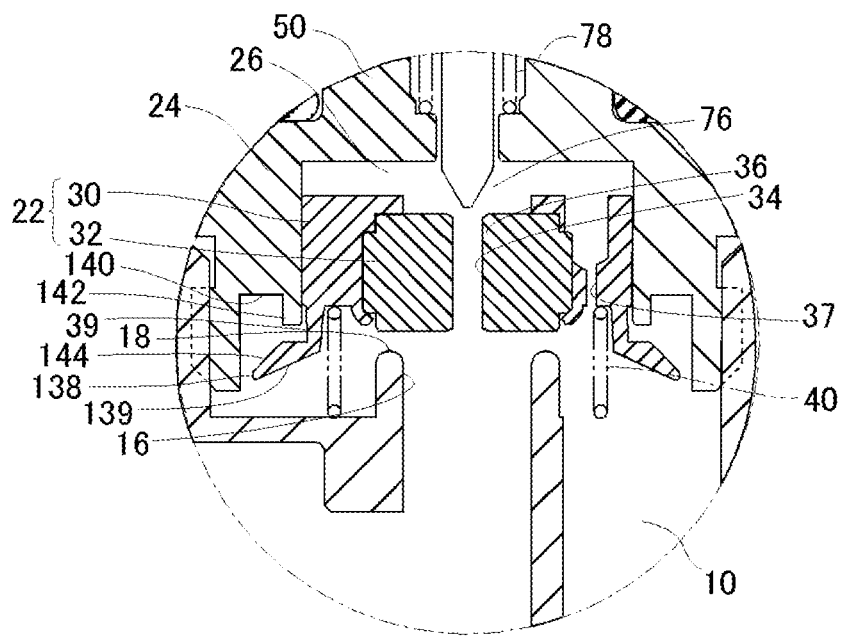

FIGS. 6A and 6B are each a partially enlarged cross-sectional view showing a structure of a sliding portion in a driven member according to still another modification. Though not mentioned in the above-described first embodiment, the following structure may be implemented as shown in FIG. 6A. That is, a surface, in a shield wall 138 of the driven member 22, which is disposed counter to the lead-in passage 10 (i.e., a side of the shield wall 138 opposite to the surface thereof that touches and leaves the guide member 24) functions as a guide surface 139 and thereby the foreign material contained in the refrigerant flowing through the lead-in passage 10 is led to the valve hole 16. In this example of FIG. 6A, the shield wall 138 is configured such that the shield wall 138 is larger and extends radially outward from the shield wall 38 of the first embodiment, and the guide surface 139 is a tapered surface having a predetermined angle.

This structure makes it possible that the foreign material, which has flowed from upstream, is more likely to hit the guide surface 139. Thereby, the foreign material hitting the guide surface 139 is bounced radially inward, which in turn makes the foreign material more likely to be led into the valve hole 16. Particularly during a process from when the main valve starts opening until it is fully opened, namely, during the process until the shield wall 138 is seated on the guide member 24, the entry of foreign material near the spacing between the driven member 22 and the guide member 24 can be inhibited.

As illustrated in FIG. 6B, an annular groove 140 (recess) may be formed on an underside of the guide member 24. This forms a wall part 142 that restricts the foreign material, which has gone around the shield wall 138, from being led into the spacing between the driven member 22 and the guide member 24. As illustrated also in FIG. 6B, the shield wall 138 is formed such that a surface of the shield wall 138 facing the guide member 24 is a tapered guide surface 144 and thereby the foreign material is led into the annular grove 140.

[Second Embodiment]

Figure 7:
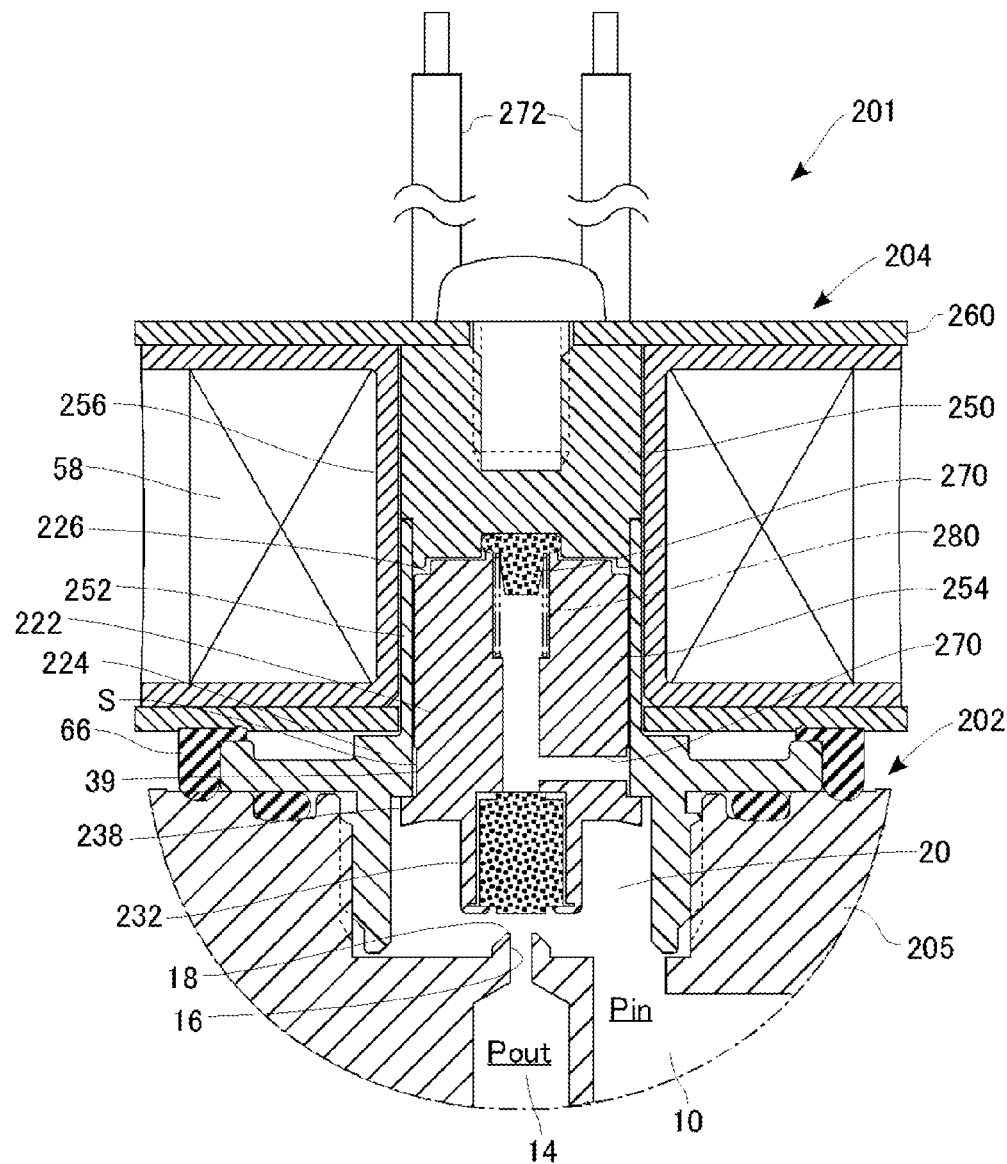
FIG. 7 is a cross-sectional view showing major components of a control valve according to a second embodiment.

A control valve according to a second embodiment differs from that of the first embodiment in that the control valve of the second embodiment is a direct acting valve using a solenoid instead of the pilot operated valve and is a normally closed valve. FIG. 7 is a cross-sectional view showing major components of the control valve according to the second embodiment.

A control valve 201 is configured by integrally assembling a valve unit 202 and a solenoid 204. The control valve 201 is provided with a body 205 commonly used with its corresponding expansion valve. Formed in the body 205 are a lead-in passage 10 leading to a not-shown lead-in port and a lead-out passage 14 leading to a not-shown lead-out port. A smaller-diameter valve hole 16 is provided in between the lead-in passage 10 and the lead-out passage 14. A driven member 222 is disposed in a pressure chamber 20 located upstream of the valve hole 16. A guide member 224, which is secured to the body 205, slidably supports the driven member 222. The driven member 222 is constructed integrally by a valve element 232 and a plunger 254. The valve element 232, which is formed of an elastic body (e.g., rubber in the second embodiment), opens and closes the valve section by touching and leaving a valve seat 18.

In the second embodiment, the guide member 224 also functions as a sleeve for a solenoid 204. As described above, the driven member 222 also functions as a plunger. In other words, the solenoid 204 includes a sleeve 252 formed integrally with the guide member 224, a core 250 fixed to the sleeve 252 in such a manner as to seal off an upper end part of the sleeve 252, a plunger 254, formed integrally with the driven member 222, which is disposed coaxially with the core 250, a bobbin 256 inserted around (outserted to) the core 250 and fitted thereto, an electromagnetic coil 58 wound around the bobbin 256, and a casing 260 assembled to the core 250 and the sleeve 252 in such a manner as to cover the electromagnetic coil 58 from outside.

A spring support 270 is provided in a central part of the underside of the core 250. And set between the spring support 270 and the plunger 254 is a spring 280 (functioning as a "biasing member") that biases the driven member 222 in a valve closing direction. The diameter of a lower half of the guide member 224 is enlarged and is screwed into and secured to the body 205. A current carrying harness 272 is led out from the electromagnetic coil 58.

A shield wall 238, which extends radially outward in the form of a flange, is provided in an lower end part of the driven member 222. A recess 39 is provided between the sliding portion of the driven member 222 relative to the guide member 224 and the shield wall 238 thereof. The recess 39 is created such that when the valve section is fully opened, a space S is created between the inner circumferential surface of the guide member 224 and the sleeve 252 and such that when the valve section is closed, an end surface of the recess 39 on a sliding portion side is positioned further toward a sliding portion side than a lower end surface of the guide member 224. A pressure chamber 226 formed between the plunger 254 and the core 250 can communicate to and from the pressure chamber 20 by way of a communicating path 270, so provided to penetrate through the driven member 222, and the recess 39.

By employing such a structure as described above, even though foreign materials contained in the refrigerant flow around the shield wall 238 and then adhere to the recess 39 when the valve section is closed, the foreign materials are trapped inside the space S when the valve section is opened. This can prevent or inhibit the foreign material from being entangled in the sliding portion formed between the driven member 222 and the guide member 224. Also, the control valve 201 is a so-called on/off valve, so that when opening the valve section starts, the valve section quickly comes to the state of being fully opened. Thus, the shield wall 238 is quickly seated on the lower end surface of the guide member 224 and thereby one end opening of the spacing between the driven member 222 and the guide member 224 is closed. As a result, the entry of foreign material into the spacing therebetween is restricted even when the valve section is opened. Hence, the malfunction of valve section caused by the entry of foreign material can be prevented or inhibited.

The description of the present invention given above is based upon illustrative embodiments. These embodiments are intended to be illustrative only and it will be obvious to those skilled in the art that various modifications could be further developed within the technical idea underlying the present invention and that such additional modifications are also within the scope of the present invention.

In the above-described embodiments, a description has been given of an example where the control valve is configured as an electromagnetic valve provided with a solenoid, which functions as an actuator for electrically regulating the opening degree of the valve section from the outside. Instead, the control valve may be configured as other electrically driven valves, such as a motor-operated valve provided with a motor that functions as an actuator, for instance. Also, the control valve may be configured as a mechanical control valve whereby the valve element is opened and closed by the pressure differences only. Also, a description has been given of an example where the control valve is applied to a hybrid vehicle and an electric-powered vehicle but it goes without saying that the control valve according to the preferred embodiments is applicable to a vehicle provided with an internal-combustion engine. It also goes without saying that the control valve according to the preferred embodiments is applicable to not only the vehicle but also other apparatuses that circulate the working fluid.

In the above-described embodiments, a description has also been given of an example where the driven member is disposed in the pressure chamber on the same side as the actuator (solenoid) relative to the valve hole and then the back pressure chamber is formed in this pressure chamber. In a modification, the driven member may be disposed in the pressure chamber opposite to the actuator relative to the valve hole and then the back pressure chamber may be formed between the body and the driven member. The back pressure chamber may be provided in a position upstream or downstream of the valve hole.

In the above-described embodiments, a description has also been given of an example where the shield wall is formed integrally with the driven member. In a modification, a shield wall is produced in a separate process from the process for producing a driven member and then the shield wall and the driven member each produced separately may be assembled together. For example, a ring-shaped shield member may be prepared and then the shield member may be inserted around (outserted to) an end part of the driven member and fitted thereto, thereby making a shield portion. More specifically, a ring-shaped shield member, formed of an elastic body such as rubber, is press-fitted and secured to a cylindrical driven member. Or alternatively, a seal ring, such as an O-ring, which serves as the shield member may be attached to the driven member.

Or still alternatively, the arrangement may be as follows. That is, a ring-shaped shield member, formed of an elastic body such as rubber, is assembled to the guide member and then the shield member assembled to the guide member is extended toward a driven member side. And a recess having a predetermined width is provided in a surface opposite to this shield member in the driven member so that this shield member is displaceable along the width direction. The arrangement may also be such that a space may be created between the sliding surface of the guide member and the recess when the valve section is fully opened and such that the shield member is seated on a sliding portion side of the recess and thereby one end opening of the spacing between the driven member and the guide member is closed.

In the above-described embodiments, a description has been given of an example where the control valve is configured as a shutoff valve that permits or shuts off the flow of refrigerant at the downstream side of a valve section of the expansion valve. Instead, the arrangement may be such that the flow of refrigerant is permitted or shut off at an upstream side of the valve section of the expansion valve. Also, the control valve according to the preferred embodiments may be configured as a stand-alone independent shutoff valve instead of being formed integrally with the expansion valve.

While the preferred embodiments of the present invention have been described using specific terms, such description is for illustrative purposes only, and it is to be understood that changes and variations may be made without departing from the spirit or scope of the appended claims.

What is claimed is:

1. A control valve comprising:
   a body having an internal passage through which a working fluid flows;
   a valve hole provided in the internal passage;
   a driven member configured to open and close a valve section by touching and leaving the valve hole;
   a guide member configured to slidably support the driven member inserted thereto; and
   a shield part, provided in the driven member, configured to close one end opening of a spacing between the driven member and the guide member when the valve section is fully opened,
   wherein the shield part is provided in an end of the driven member on a side exposed from a sliding portion of the driven member relative to the guide member when the valve section is closed,
   wherein as the driven member is displaced in a valve opening direction, the shield part becomes seated on an end surface of one end side of the guide member, and further displacement of the driven member in the valve opening direction is restricted when the valve section is fully opened,
   wherein after the driven member starts opening until the shield part becomes seated on the end surface, a pressure difference between the one end opening and another end opening of the spacing allows the working fluid to leak from the one end opening toward the other end opening, and
   wherein when the valve section is fully opened, the shield part closes a space formed between the driven member and the guide member from outside by touching the end surface of one end side of the guide member.

2. A control valve according to claim 1, wherein a recess is provided between the sliding portion of the driven member relative to the guide member and the shield part thereof,
- wherein the recess is formed such that when the valve section is fully opened, a space is created in a sliding surface of the guide member,
- wherein when the valve section is fully opened, the shield part closes the space from outside by touching the end surface of one end side of the guide member, and
- wherein the recess is formed such that when the valve section is closed, an end surface of the recess on a sliding portion side is positioned further toward the sliding portion side than the end surface of the guide member.

3. A control valve according to claim 1, wherein a labyrinth structure is provided in a sliding surface, of the driven member, between the driven member and the guide member.

4. A control valve according to claim 1, wherein the shield part has a guide surface the shape of which is such that foreign material contained in the working fluid is led to the valve hole, and
- wherein the guide surface of the shield part is positioned opposite to a contact face thereof with the guide member.

5. A control valve according to claim 1, wherein the guide member has a wall part that restricts foreign material, which has flowed around the shield part, from being led into the one end opening of the spacing therebetween.

6. A control valve according to claim 2, wherein the control valve is a pilot operated control valve,
- wherein the body has a lead-in passage for introducing the working fluid, a lead-out passage for leading out the working fluid, and the valve hole provided between the lead-in passage and the lead-out passage,
- wherein the driven member divides a space surrounded by the body and the guide member into the lead-in passage and a back pressure chamber, and touches and leaves the valve hole to open and close a main valve that is the valve section,
- the driven member has a pilot valve hole through which the back pressure chamber and the lead-out passage communicate with each other, and a leak passage through which the back pressure chamber and the lead-in passage communicate with each other, the leak passage having a smaller cross-section than the pilot valve hole,
- the control valve further comprising:
  - a pilot valve element configured to open and close a pilot valve by touching and leaving the pilot valve hole;
  - a solenoid configured to drive the pilot valve element in a direction of axis line; and
  - a spring configured to bias the driven member in a valve opening direction of the main valve,
- wherein a pressure difference applied to the driven member as a result of closure of the pilot valve causes the driven member to be driven in a valve closing direction of the main valve, and a pressure difference applied to the driven member as a result of opening of the pilot valve causes the driven member to be driven in the valve opening direction of the main valve.

* * * * *